United States Patent
Markham et al.

(10) Patent No.: US 7,231,664 B2
(45) Date of Patent: Jun. 12, 2007

(54) SYSTEM AND METHOD FOR TRANSMITTING AND RECEIVING SECURE DATA IN A VIRTUAL PRIVATE GROUP

(75) Inventors: Thomas R. Markham, Anoka, MN (US); Lynn Marquette Meredith, Eagan, MN (US); Robert Otto Hanzlik, Coon Rapids, MN (US); Geoffrey A. Lowe, White Bear Lake, MN (US)

(73) Assignee: Secure Computing Corporation, Saint Paul, MN (US)

( * ) Notice: Subject to any disclaimer, the term of this patent is extended or adjusted under 35 U.S.C. 154(b) by 1053 days.

(21) Appl. No.: 10/234,224

(22) Filed: Sep. 4, 2002

(65) Prior Publication Data

US 2004/0044908 A1 Mar. 4, 2004

(51) Int. Cl.
*H06F 15/173* (2006.01)
*H04L 9/00* (2006.01)

(52) U.S. Cl. .................. 726/15; 726/27; 713/163; 709/229; 705/59; 455/445

(58) Field of Classification Search ................. 726/15, 726/27; 713/163; 709/229; 705/59; 455/445
See application file for complete search history.

(56) References Cited

U.S. PATENT DOCUMENTS

| 5,748,736 | A |   | 5/1998  | Mittra        |         |
|-----------|---|---|---------|---------------|---------|
| 5,758,069 | A | * | 5/1998  | Olsen         | 726/27  |
| 6,049,789 | A | * | 4/2000  | Frison et al. | 705/59  |
| 6,055,429 | A | * | 4/2000  | Lynch         | 455/445 |
| 6,079,020 | A | * | 6/2000  | Liu           | 726/15  |
| 6,134,327 | A | * | 10/2000 | Van Oorschot  | 380/30  |
| 6,167,445 | A |   | 12/2000 | Gai et al.    |         |
| 6,173,399 | B1| * | 1/2001  | Gilbrech      | 713/153 |
| 6,182,226 | B1|   | 1/2001  | Reid et al.   |         |

(Continued)

FOREIGN PATENT DOCUMENTS

GB    2356763    5/2001

(Continued)

OTHER PUBLICATIONS

Eli Herscovitz, Secure Virtual Priviate networks: The Future of Data Communications , International Journal of Network Management , 9, 213-220(1999).*

*Primary Examiner*—Taghi T. Arani
(74) *Attorney, Agent, or Firm*—Schwegman, Lundberg, Woessner & Kluth, P.A.

(57) ABSTRACT

A novel system and method for transmitting and receiving secure data in a virtual private group (VPG). In one embodiment, a method for transmitting secure data from a first node to a second node includes accessing a group membership table on the first node, the group membership table having group membership information for each group, including a first group, to which the first node belongs and group security information associated with each group, wherein the first group has two or more members, and checking the group membership table to determine if the second node is a member of the first group. If the second node is a member of the first group, the method further includes encrypting a data packet using the group security information associated with the first group, processing the encrypted data packet, and transmitting the encrypted data packet from the first node to the second node.

35 Claims, 12 Drawing Sheets

U.S. PATENT DOCUMENTS

| | | |
|---|---|---|
| 6,195,751 B1 * | 2/2001 | Caronni et al. .............. 713/163 |
| 6,215,872 B1 * | 4/2001 | Van Oorschot .............. 380/30 |
| 6,226,748 B1 * | 5/2001 | Bots et al. .................... 726/15 |
| 6,226,751 B1 | 5/2001 | Arrow et al. |
| 6,363,154 B1 | 3/2002 | Peyravian et al. |
| 6,546,546 B1 * | 4/2003 | Van Doorn ................. 717/114 |
| 2002/0037736 A1 | 3/2002 | Kawaguchi et al. |
| 2002/0055989 A1 | 5/2002 | Stringer-Calvert et al. |
| 2002/0157024 A1 | 10/2002 | Yokote |
| 2002/0164025 A1 * | 11/2002 | Raiz et al. .................. 380/231 |
| 2003/0055989 A1 * | 3/2003 | Zamanzadeh et al. ...... 709/229 |
| 2003/0126464 A1 | 7/2003 | McDaniel et al. |
| 2003/0204722 A1 | 10/2003 | Schoen et al. |
| 2003/0226013 A1 * | 12/2003 | Dutertre ..................... 713/163 |

FOREIGN PATENT DOCUMENTS

| | | |
|---|---|---|
| WO | WO-0069145 A1 | 11/2000 |
| WO | WO-0078004 A3 | 12/2000 |

* cited by examiner

SYSTEM AND METHOD FOR TRANSMITTING AND RECEIVING SECURE DATA IN A VIRTUAL PRIVATE GROUP

FIELD OF THE INVENTION

The present invention relates to data security, and more particularly to the transmitting and receiving of secure data in a virtual private group.

BACKGROUND OF THE INVENTION

There are a growing number of Internet users. In addition, there are a growing number of Internet applications that provide an array of services for these users. In such an environment, data security is often a concern. Users continually transmit and receive data over the Internet, and much of this data may be insecure. Unintended recipients may not only have access to the data, but may also obtain information concerning the identity of the sender(s).

The Internet Protocol is an addressing protocol designed to facilitate the routing of traffic in a network. The Internet Protocol is used on many computer networks, including the Internet. It is often desirable to protect information sent with the Internet Protocol using different types of security. Implementing security with the Internet Protocol allows private or sensitive information to be sent over a network with a degree of confidence that the information will not be intercepted, examined, or altered.

Internet Protocol security (IPsec) is a protocol for implementing security for communications on networks using the Internet Protocol through the use of cryptographic key management procedures and protocols. By using IPsec, two endpoints can implement a Virtual Private Network (VPN). Communications between the two endpoints are made secure by IPsec on a packet-by-packet basis. IPsec entities at connection endpoints have access to, and participate in, critical and sensitive operations.

IPsec defines a set of operations for performing authentication and encryption at the packet level by adding protocol headers to each packet. IPsec also implements security associations to identify secure channels between two endpoints for a VPN. A security association is a unidirectional session between the two endpoints. Since a security association is unidirectional, a minimum of two security associations is required for secure, bidirectional communications between the two endpoints when using IPsec in a VPN.

VPN's could be called virtual private links. They provide great point-to-point security, but they do not scale well to support large groups. For example, assume a group of twelve users wishes to create their own private network overlay to provide secure collaboration. These twelve users need a cryptographically isolated network that allows each of the machines to communicate directly with any of the other machines in the group. If the group was using Ipsec, they would need to establish $(N*(N-1))/2$ pairwise associations, where n is equal to twelve. IPsec and the associated IKE key management does not (and was never designed to) provide group management. IPsec also does not function well in an environment having Network Address Translation (NAT) devices.

For the reasons stated above, and for other reasons stated below which will become apparent to those skilled in the art upon reading and understanding the present specification, there is a need for the present invention.

SUMMARY OF THE INVENTION

In one embodiment, a method for transmitting secure data from a first node to a second node includes accessing a group membership table on the first node, the group membership table having group membership information for each group, including a first group, to which the first node belongs and group security information associated with each group, wherein the first group has two or more members, and checking the group membership table to determine if the second node is a member of the first group. If the second node is a member of the first group, the method further includes encrypting a data packet using the group security information associated with the first group, processing the encrypted data packet, and transmitting the encrypted data packet from the first node to the second node.

In another embodiment, a method for receiving secure data on a first node that is sent from a second node includes accessing a group membership table on the first node, the group membership table having group membership information for each group, including a first group, to which the first node belongs and group security information associated with each group, wherein the first group has two or more members, and checking the group membership table to determine if the second node is a member of the first group. If the second node is a member of the first group, the method further includes validating an encrypted data packet that has been sent from the second node, decrypting the encrypted data packet using the group security information associated with the first group, and processing the decrypted data packet.

These and other embodiments will be described in the detailed description below.

DETAILED DESCRIPTION

Figure 1A:
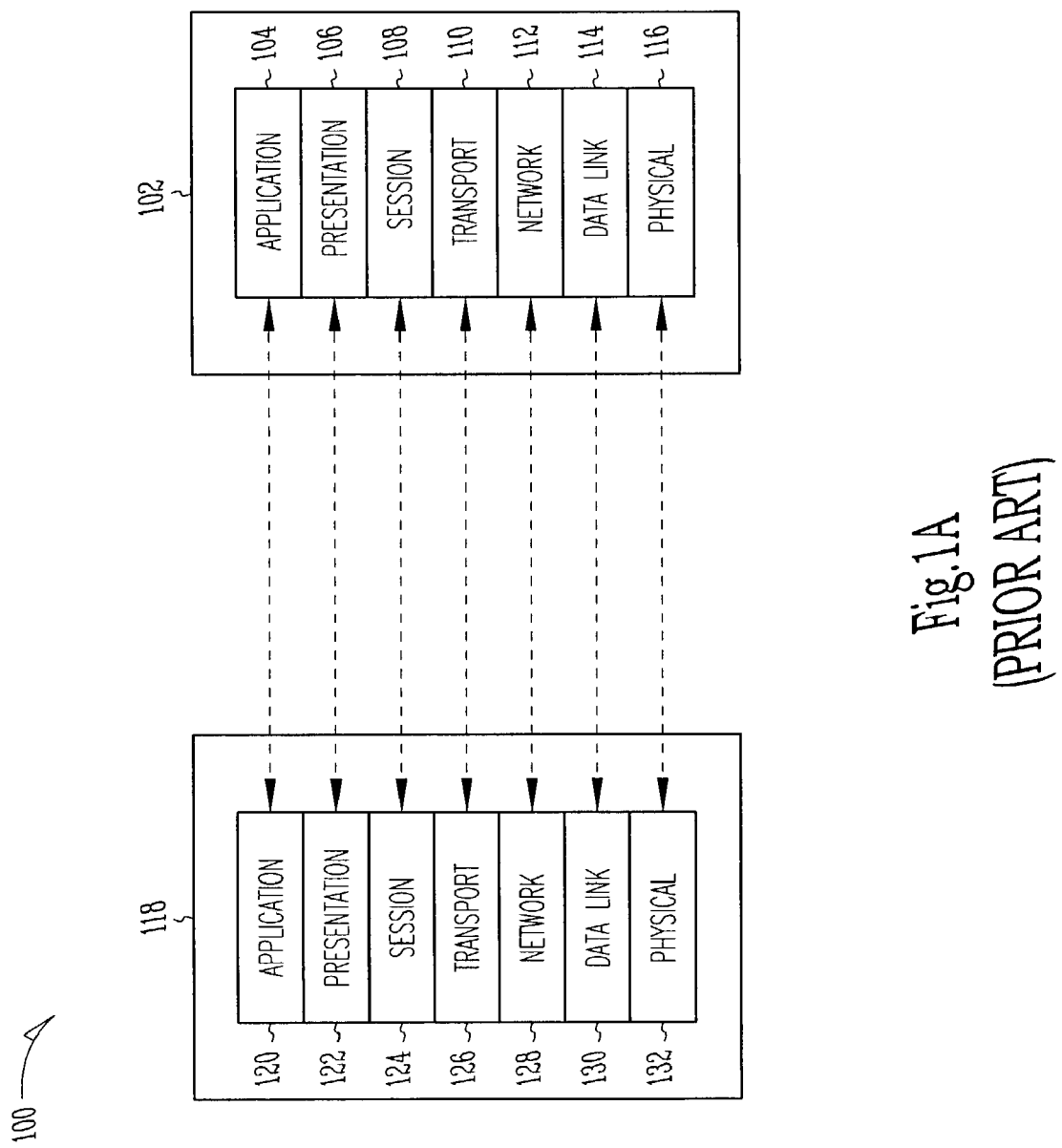
FIG. 1A is a network diagram illustrating the Open Systems Interconnection (OSI) seven-layer model.

A novel system and method for transmitting and receiving secure data in a virtual private group is described herein. In the following detailed description of the embodiments, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. It is also to be understood that the various embodiments of the invention, although different, are not necessarily mutually exclusive. For example, a particular feature, structure or characteristic described in one embodiment may be included within other embodiments. The following description is, therefore, not to be taken in a limiting sense.

Introduction

There are cases where groups of people from different organizations (i.e., administrative domains) or people from different departments within an organization (i.e., organizational domains) work together to collaborate on a problem. Dynamic coalitions created to respond to a crisis are one example of a distributed collaborative environment. These groups need to clearly communicate a lot of information in a short time to respond to the crisis. Development teams from multiple corporations working on a product represent a typical commercial collaboration requirement. The collaboration tools may not provide adequate mechanisms to secure the various types of information exchanged among the group members.

A Virtual Private Group (VPG) communication system allows a group of computing devices to communicate securely, such that all communications between the group members are readable by all of the group members, but not readable by those outside of the group. In a VPG syste, a group of two or more computing devices communicate securely over a network. The group of computing devices may, in one implementation, be part of a wireless network, or, in another implementation, may operate on a wired network. In a wireless network, the computing devices may include devices such as cellular telephones or personal digital assistants (PDA's).

In one embodiment, the VPG communication system supports peer-to-peer and broadcast communications within the defined group. That is, the VPG allows every member of a group to communicate with every other member of the group while providing data confidentiality, packet integrity, and source authentication. The structure of the VPG can be completely independent of the physical topology of the underlying network; VPG operation can be transparent to the host operating system and applications. In addition, the VPG provides a means of managing keys for the group that is simpler than building (N*(N−1))/2 pairwise connections, and the group management supports members joining and leaving the group. In addition, VPG members can exist behind a classic NAT (Network Address Translation) device. NAT acts as a gateway between a private network and a public network. NAT provides the functionality to map the addressing mechanism between a computer and the external world. NAT requires that an intermediate device be placed between a group of one or more computers and the external network. In classic NAT with static address translation, global Internet Protocol (IP) addresses are assigned and mapped to specific private IP address behind the NAT device. Because a client inside such a private network always has the same global IP address, an outside client can call the inside client using that address. In classic NAT with dynamic address translation, the number of private IP addresses inside a network is greater than the number of available IP addresses outside the network. The dynamic translation process assigns IP addresses to outgoing packets based on a set of available outside addresses. An outside client is not able to send packets to an inside client, because it does not know the IP address of that client. VPG's work with both classic NAT having static address translation and classic NAT having dynamic address translation.

This embodiment, as well as other embodiments of the invention, are further described below.

Description

Devices in a network use protocols to communicate. A protocol is a set of rules and conventions between the communicating participants. Since the protocols are often complex, they are designed in layers, to make their implementations more manageable. The Open Systems Interconnection (OSI) model is a seven-layer model for network communications. It provides a framework in which standards can be developed for the services and protocols at each layer. FIG. 1A is a network diagram illustrating the OSI seven-layer model. In FIG. 1A, network 100 includes system 102 and system 118. Both system 102 and system 118 include a device that implements a seven-layer communication stack according to the OSI model. Physical layer 132 of system 118 is coupled to physical layer 116 of system 100. In order for an application in system 102 to communicate with an application in system 118, each application must use a set of common layers in the seven-layer stack. Data is sent through each applicable layer of the stack in one system, and subsequently received through each applicable layer of the stack in the other system. Each layer adds different overhead and functionality. As a result, application layer 104 in system 102 is operatively coupled to, and effectively communicates with, application layer 120 in system 118. In an implementation where all seven layers are used, presentation layer 106 of system 102 is operatively coupled to presentation layer 122 of system 118. Session layer 108 of system 102 is operatively coupled to session layer 124 of system 118. Transport layer 110 of system 102 is operatively coupled to transport layer 126 of system 118. Network layer 112 of system 102 is operatively coupled to network layer 128 of system 118. Data link layer 114 of system 102 is operatively coupled to data link layer 130 of system 118, and physical layer 116 of system 102 is coupled to, and directly interchanges data with, physical layer 132 of system 118. In this fashion, two systems effectively communicate with one another at the application level by implementing layers of the OSI stack.

Figure 1B:
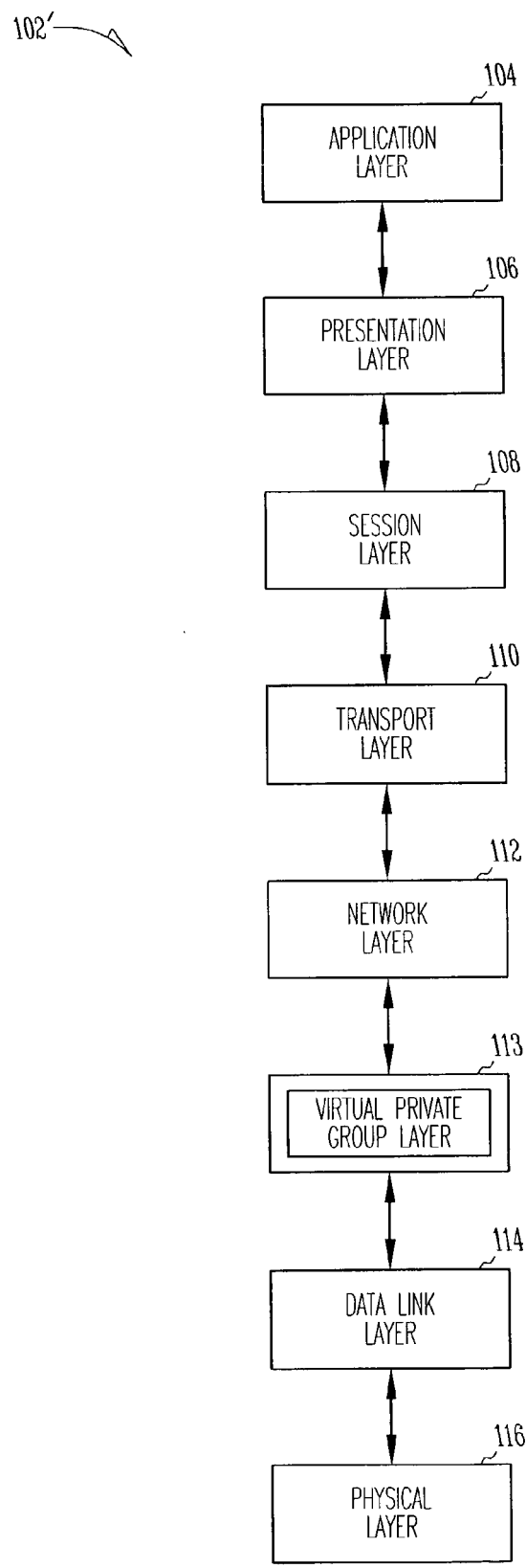
FIG. 1B is layer diagram illustrating a Virtual Private Group (VPG) layer in a network model according to an embodiment of the invention.

FIG. 1B is layer diagram illustrating a Virtual Private Group (VPG) layer in a network model according to an embodiment of the invention. In this embodiment, system 102' is modified to include an additional layer in the network model. The additional layer is Virtual Private Group (VPG) Layer 113. VPG Layer 113 is located between Network Layer 112 and Data Link Layer 114. VPG Layer 113 adds a layer of encryption and authentication of data packets that are transmitted through the communication stack. In order for system 102' to communicate securely with another system that is also a member of a Virtual Private Group, the other system must also implement the added VPG Layer in its communication stack.

Figure 1C:
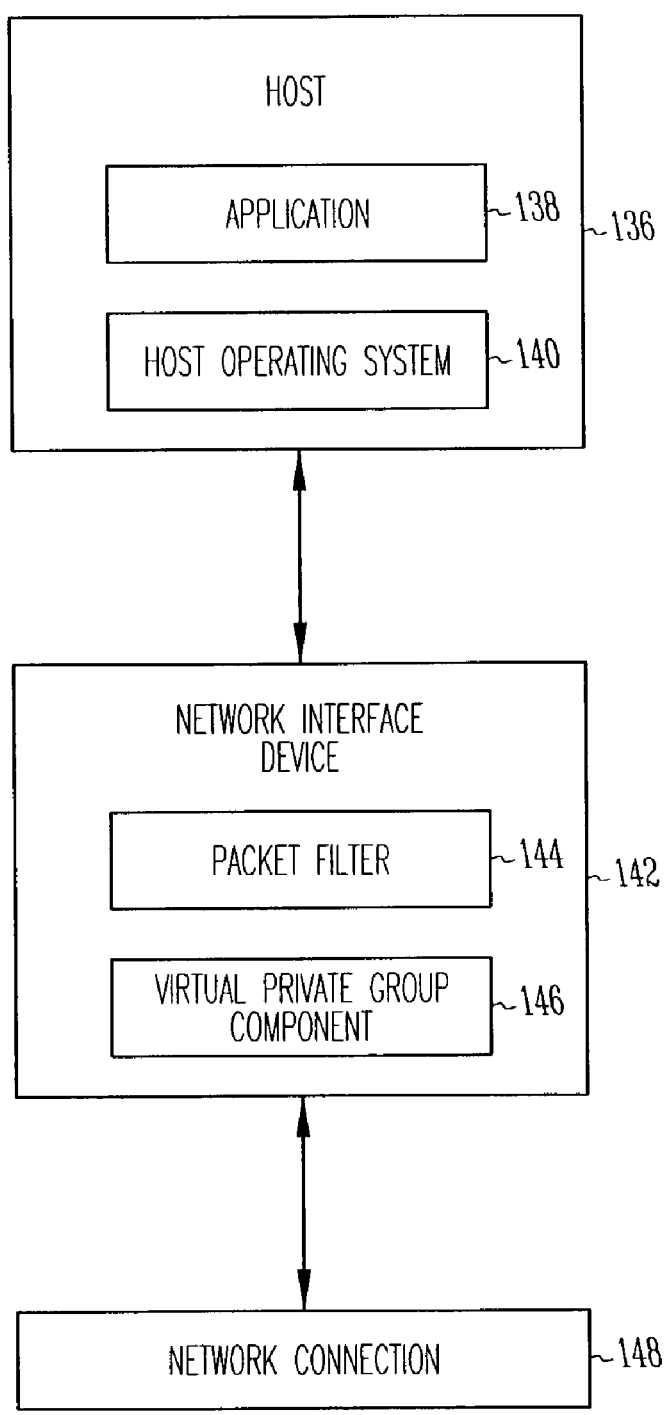
FIG. 1C is a block diagram illustrating a VPG and packet filtering model according to an embodiment of the invention.

FIG. 1C is a block diagram illustrating a VPG and packet filtering model according to an embodiment of the invention. This embodiment shows how a VPG implementation can be integrated with a packet filtering implementation in a communication model. In this embodiment, system 134 includes host 136, network interface device 142, and network connection 148. Host 136 is coupled to network interface device 142, and network interface device 142 is coupled to network connection 148. In one implementation, network connection 148 is an Ethernet network connection. Host 136 includes application 138, and host operating system 140. Application 138 operates on host operating system 140, and host 136 implements one or more communication layers to communicate with network interface device 142. In one embodiment, network interface device 142 includes packet filter 144, and VPG component 146. In this fashion, network interface device 142 has the capability to implement both packet filtering and VPG encryption/decryption. In such an embodiment, VPG encryption/decryption is transparent to application 138 and host operating system 140. Packet filtering is applied to the plaintext. Network connection 148 communicates with a network. The network can be implemented as a wired or wireless network. The network medium is not relevant.

Figure 2:
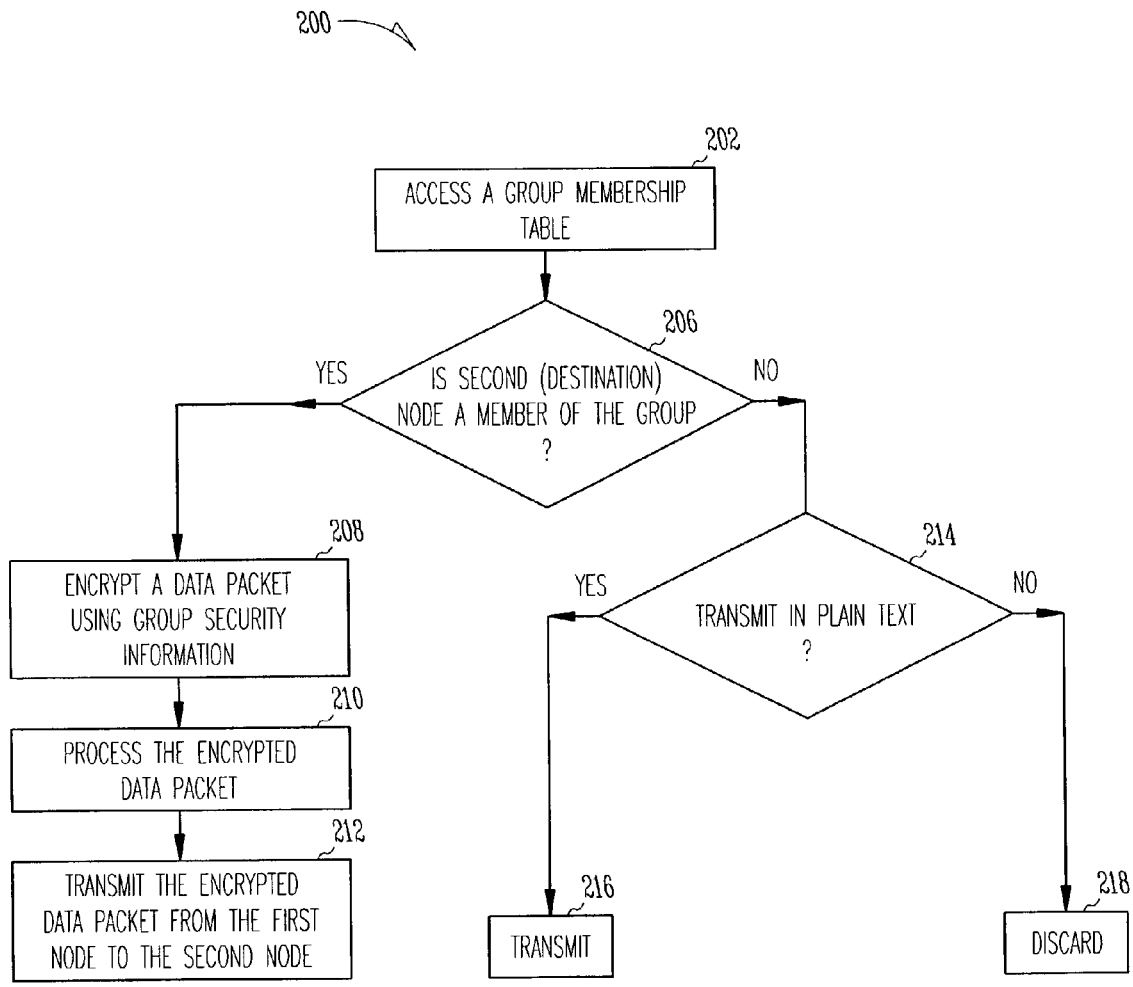
FIG. 2 is a flow diagram illustrating a method for transmitting secure data in a VPG according to an embodiment of the invention.

FIG. 2 is a flow diagram illustrating a method for transmitting secure data between a first and a second node in a VPG according to an embodiment of the invention. In the embodiment shown in FIG. 2 at 202, a first node accesses a group membership table. The group membership table includes group membership information for each group, including a first group, to which the first node belongs and group security information associated with each group, wherein the first group has two or more members. At 206, the first node checks the group membership table to determine if the second (receiving) node is a member of the first group. If the second node is a member of the first group, then the first node encrypts a data packet using the group security information at 208. At 210, the first node processes the encrypted data packet, and at 212, the first node transmits the encrypted data packet to the second node. If, at 206, the first node determines that the second node is not a member of the first group, control moves to 214. At 214, the first node checks to determine if it should transmit data in plaintext to the second node. This will be determined according to the policy established by an administrator. If the policy allows such transmission, then the data will be transmitted as plaintext at 216. If the policy, however, disallows such transmission, then the data is discarded at 218.

In one embodiment, the managing of the group membership table includes receiving the group membership table from a policy server over a secure connection. In another embodiment, the managing of the group membership table includes adding a group member to the group membership table or removing a group member from the group membership table. In another embodiment, the managing of the group membership table includes managing a number of group member entries in the group membership table, each group member entry having a node address and group security association information. The group security information includes the group security association information. In another embodiment, the managing of the group membership table includes managing a plurality of group member entries in the group membership table, each group member entry having an Internet Protocol address and group security association information, wherein the group security information includes the group security association information.

In one embodiment, the checking of the group membership table includes checking the group membership table to determine if one of the group member entries for the first group includes the Internet Protocol address of the second node.

In one embodiment, the encrypting of the data packet includes encrypting the data packet using a symmetric encryption algorithm, such as the Data Encryption Standard (DES), triple DES, or the Advanced Encryption Standard (AES). In another embodiment, the encrypting of the data packet includes encrypting the datapacket using a group membership key. In another embodiment, the encrypting of the data packet includes encrypting the data packet using a group traffic encryption key. In another embodiment, the encrypting of the data packet includes encapsulating the data packet using an Encapsulating Security Payload header.

In one embodiment, the processing of the encrypted data packet includes adding an Internet Protocol header to the encrypted data packet.

Figure 3:
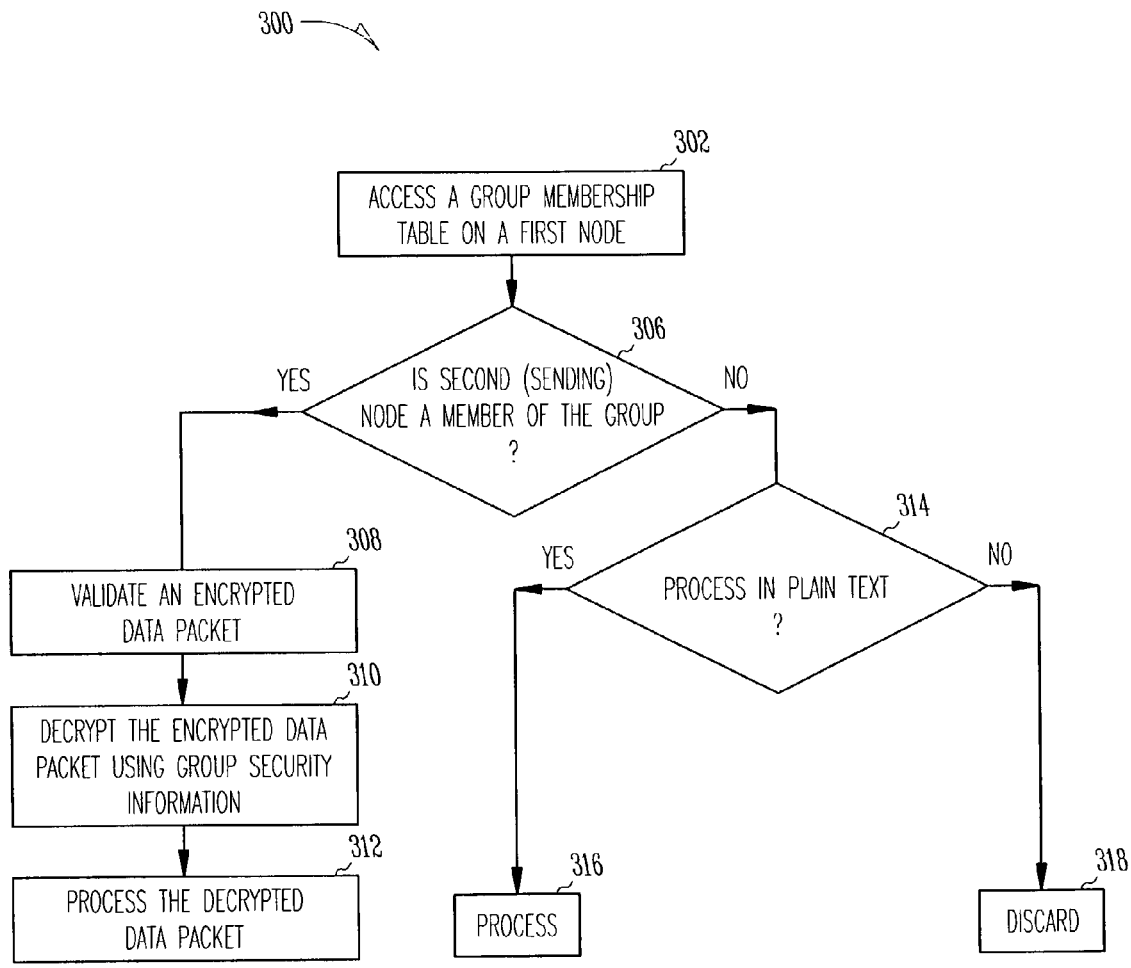
FIG. 3 is a flow diagram illustrating a method for receiving secure data in a VPG according to an embodiment of the invention.

FIG. 3 is a flow diagram illustrating a method for receiving secure data in a VPG according to an embodiment of the invention. In this embodiment, a first node accesses a group membership table at 302. The group membership table includes group membership information for each group, including a first group, to which the first node belongs and group security information associated with each group, wherein the first group has two or more members. At 306, the first node checks the group membership table to determine if a second (sending) node is a member of the first group. If the second node is a member of the first group, then the first node validates, at 308, an encrypted data packet that has been sent from the second node. At 310, the first node decrypts the encrypted data packet using the group security information, and at 312, the first node processes the decrypted data packet. If, at 306, the first node determines that the second node is not a member the first group, control moves to 314. At 314, the first node checks to determine if it should process data in plaintext from the second node. This will be determined according to the policy established by an administrator. If the policy allows such processing, then the data will be processed as plaintext at 316. If the policy, however, disallows such processing, then the data is discarded at 318.

In one embodiment, the managing of the group membership table includes receiving the group membership table from a policy server over a secure connection. In another embodiment, the managing of the group membership table includes adding a group member to the group membership table. In another embodiment, the managing of the group membership table includes removing a group member from the group membership table. In another embodiment, the managing of the group membership table includes managing a plurality of group member entries in the group membership table, each group member entry having a node address and group security association information, wherein the group security information includes the group security association information. In another embodiment, the managing of the group membership table includes managing a plurality of group member entries in the group membership table, each group member entry having an Internet Protocol address and group security association information, wherein the group security information includes the group security association information.

In one embodiment, the checking of the group membership table includes checking the group membership table to determine if one of the group member entries for the first group includes the Internet Protocol address of the second node.

In one embodiment, the validating of the encrypted data packet includes authenticating the encrypted data packet using the group security information associated with the first group.

In one embodiment, the decrypting of the encrypted data packet includes decrypting the encrypted data packet using a triple Data Encryption Standard algorithm. In another embodiment, the decrypting of the encrypted data packet includes decrypting the encrypted data packet using a group membership key. In another embodiment, the decrypting of the encrypted data packet includes decrypting the encrypted data packet using a group traffic encryption key. In another embodiment, the decrypting of the encrypted data packet includes decrypting the encrypted data packet using an Encapsulating Security Payload header.

In one embodiment, the processing of the decrypted data packet includes filtering the decrypted data packet to detect unauthorized packets.

Figure 4A:
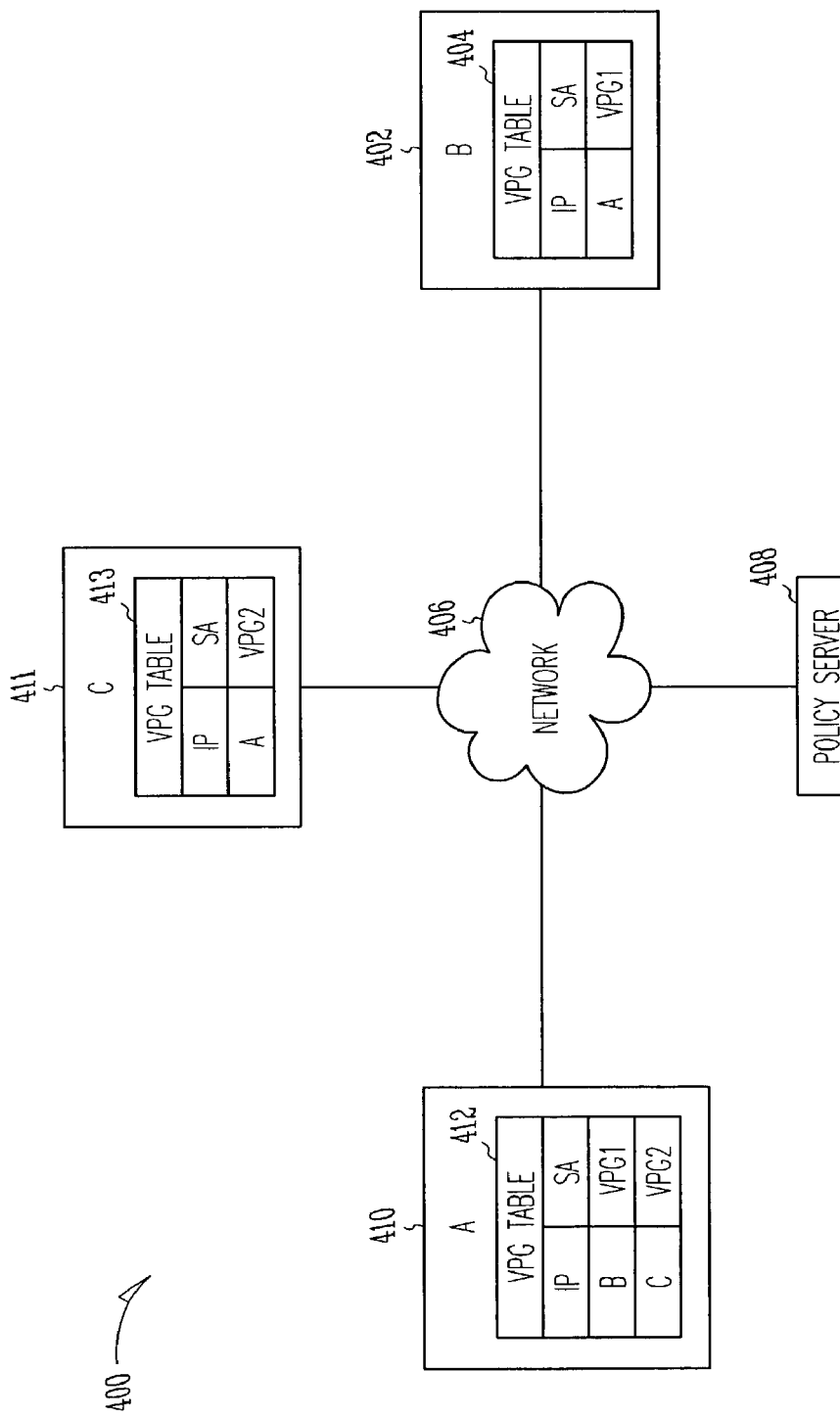
FIG. 4A is a network diagram illustrating a VPG system having multiple nodes according to an embodiment of the invention.

FIG. 4A is a network diagram illustrating a VPG system having multiple nodes according to an embodiment of the invention. VPG system 400 includes node 402, network 406, policy server 408, node 410, and node 411. Node 402, policy server 408, node 410, and node 411 are each operatively coupled to network 406. Network 406 may be, for instance, the Internet, or it may be a private network. Node 402 and node 410 are both members of "VPG1". Node 410 and node 411 are both members of "VPG2." Policy server 408 manages a security policy for the VPG's. Node 402 includes VPG table 404. Node 402 is a member of "VPG1." Each entry in the table includes an Internet Protocol (IP) address of a node that is also a member of a "VPG1," and a reference to security associations associated with this VPG. These security associations are used when encrypting data in for "VPG1." All members of this VPG use the same security association information. In one embodiment, the IP address is a subnet address (in order to identify an entire subnet as a part of a particular VPG). In one embodiment, node 402 has a separate VPG table for each VPG that it is a member of (when it is a member of more than one VPG). In another embodiment, node 402 has a single VPG table that includes data for all VPG's that node 402 is a member of. In the example shown in FIG. 4A, node 402 includes one VPG table for the VPG labeled "VPG1". VPG table 404 shows that node "A" (which is node 410) is also a member of "VPG1". Node 410 also includes a VPG table. Because node 410 is also a member of "VPG1", it includes VPG table 412 having information for "VPG1". VPG table 412 shows that node "B" (which is node 402) is included in its list of members. Node 410 is also a member of "VPG2." Therefore, VPG table 412 also include information for "VPG2." VPG table 412 shows that node "C" (which is node 411) is included as a member of "VPG2." Node 411 also includes VPG table 413. Because node 411 is a member of "VPG2," VPG table 413 includes entries for node "A" (i.e., node 410), which is also a member of "VPG2." VPG table 413 does not include any entries for "VPG1," because node 411 is not a member of "VPG1."

Figure 4B:
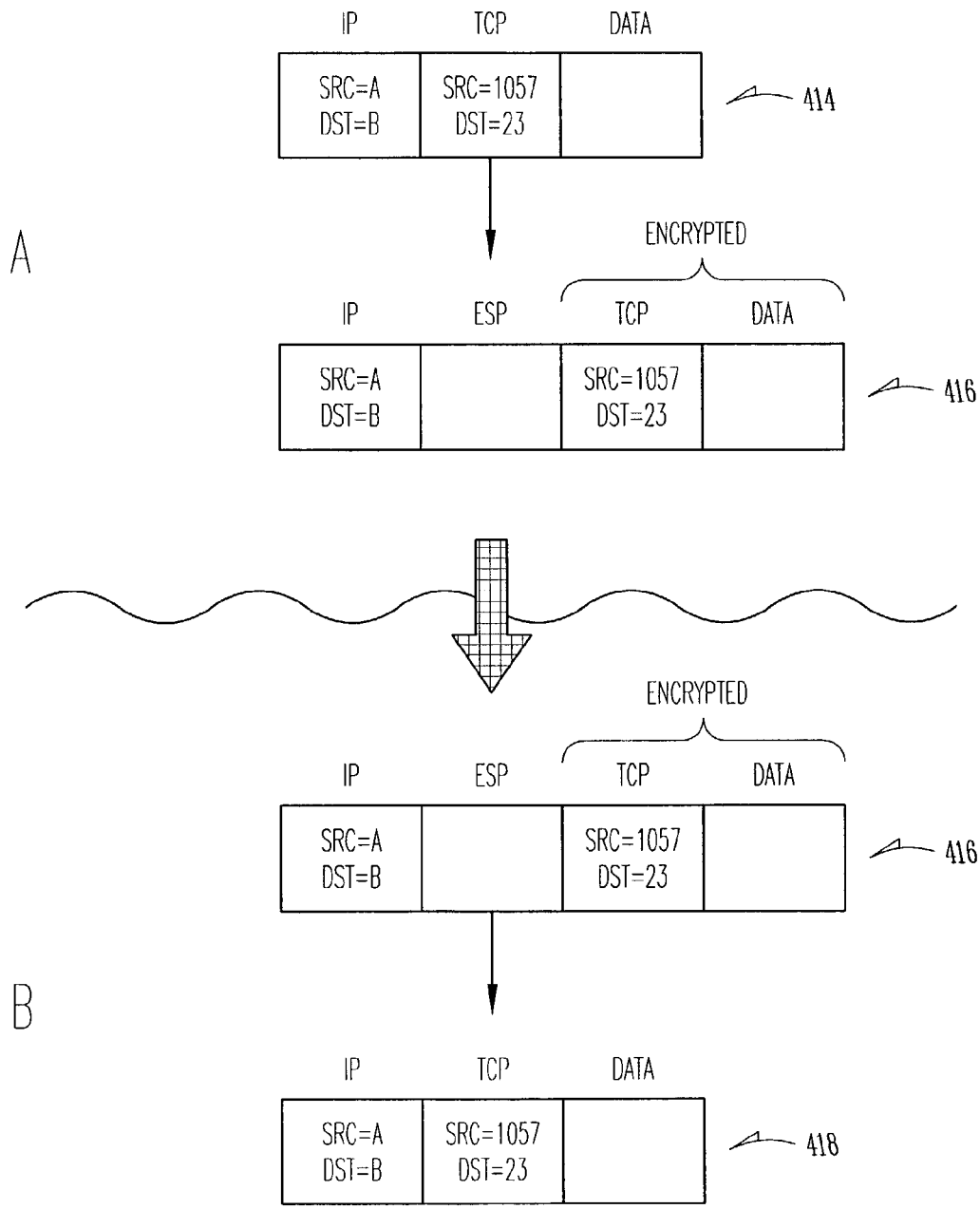
FIG. 4B is a packet diagram illustrating a packet-level flow of data in the VPG system shown in FIG. 4A.

FIG. 4B is a packet diagram illustrating a packet-level flow of data in the VPG system shown in FIG. 4A. In the example shown in FIG. 4B, node 410 is transmitting data to node 402. An ESP header provides encryption protection and authentication for an Internet Protocol packet. With VPG's, the policy server handles key exchange, so Internet Key Exchange (IKE) is not done between peers for VPG communication. It is to be noted that checksums, lengths, and next protocol fields are updated accordingly when headers are modified.

When node 410 (hereinafter node "A") transmits secure data to node 402 (hereinafter node "B"), it begins by building packet 414 in the communication stack on node "A". Packet 414 includes a data field (i.e. the "payload," at the application layer), a Transmission Control Protocol (TCP) field, and an IP field. The IP field indicates that the source of the transmission is node "A", and that the destination is node "B". The TCP field indicates that the source port of node "A" is port "1057", and that the destination port of node "B" is port "23". Node "A" determines that node "B" is a member of the VPG, and then encrypts the data to build packet 416. In this embodiment, the data is encrypted using, for instance, a symmetric encryption algorithm, such as DES, triple DES, or AES. This is shown as the Encrypted data field of packet 416. The TCP field from packet 414 is copied into packet 416. An ESP field is added to packet 416. Finally, an IP field is added in packet 416 that is a copy of the IP field in packet 414, except that it includes a next protocol value of VPG. Packet 416 is transmitted across the Internet network to node "B".

Node "B" receives packet 416 that has been transmitted across the Internet. Node "B" analyzes the IP field of packet 416 to determine that node "A" is the sender. Node "B" looks in VPG Table 404 to determine that the IP address of node "A" is included, and therefore that node "A" is a member of "VPG1". Node "B" verifies the correctness of the encapsulation of packet 416. Node "B" then decrypts and authenticates packet 416 based on the ESP and security association information for "VPG1" to create packet 418. Packet 418 includes a decrypted data field, a TCP field, and an IP field. The next protocol field in the IP field is set based on the transport header of the original packet.

Figure 5A:
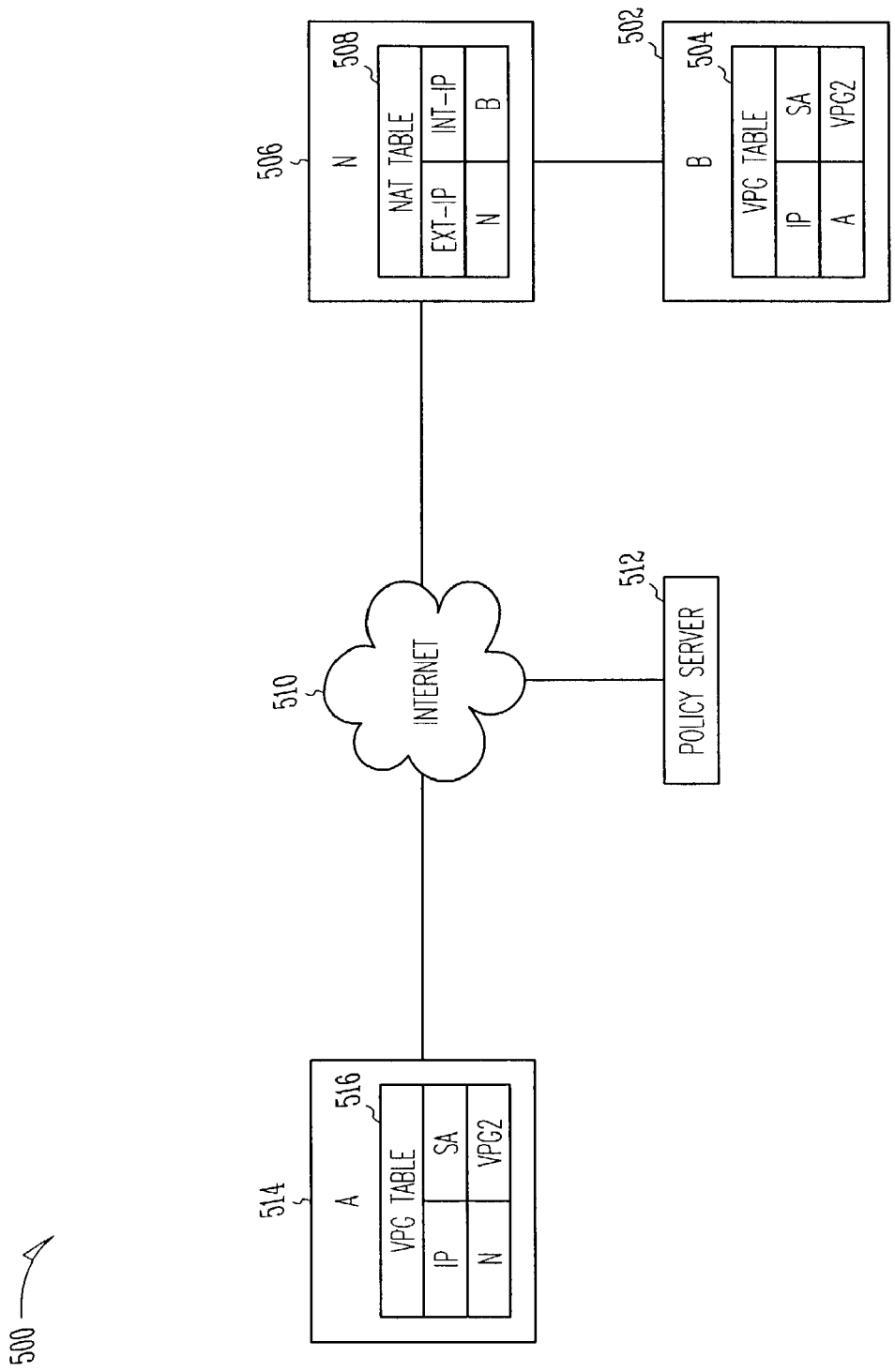
FIG. 5A is a network diagram illustrating a VPG system having multiple nodes and a Network Address Translation (NAT) device according to an embodiment of the invention.

FIG. 5A is a network diagram illustrating a VPG system having multiple nodes and a Network Address Translation (NAT) device according to an embodiment of the invention. Network 500 includes node 514 (hereinafter node "A"), Internet network 510, Policy server 512, Network Address Translator 506 (hereinafter node "N"), and node 502 (hereinafter node "B"). Node "A", node "N", node "B", and Policy server 512 are each operatively coupled through Internet network 510. Node "A" includes VPG Table 516. VPG Table 516 includes information for "VPG2", indicating that node "N" is a member of "VPG2." VPG Table also includes security association information for "VPG2". Because node "B" is behind node "N" (a NAT device), node "A" does not have direct access to, or IP address information for, node "B". Therefore, node "A" only includes IP address information for node "N" in its VPG table. Node "N" includes NAT Table 508. NAT Table 508 includes fields for internal IP address information, and external IP address information. NAT Table 508 helps node "N" route external messages to their appropriate destinations. Node "B" is included in NAT Table 508. Therefore, node "N" routes any messages sent to the IP address of node "N" to node "B". Node "B" includes VPG Table 504. VPG Table 504 includes an IP address of node "A", indicating that node "A" is a member of the virtual private group "VPG2". The role of Policy server 512 is to provide security policy information to node "A" and node "B", including the VPG tables. Since node "B" is behind a NAT device, a channel through node "N" is opened up so that traffic between Policy server 512 and node "B" is properly translated.

Figure 5B:
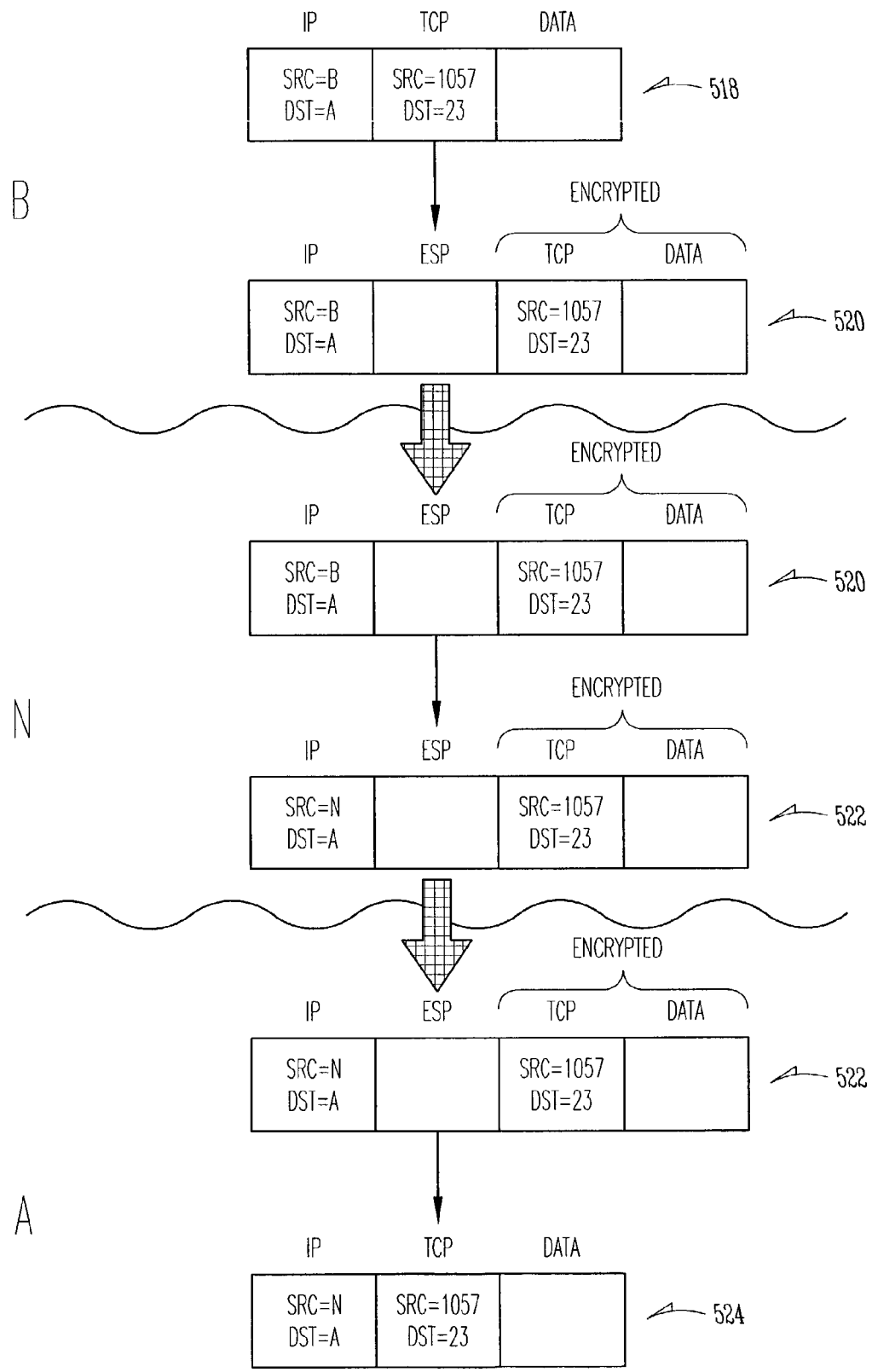
FIG. 5B is a packet diagram illustrating a first packet-level flow of data in the VPG system shown in FIG. 5A.

FIG. 5B is a packet diagram illustrating a first packet-level flow of data in the VPG system shown in FIG. 5A. In the example shown in FIG. 5B, node "B" is transmitting data to node "A". Node "B" begins by building packet 518, which includes a data field, a TCP field, and an IP field. The IP field indicates that the source is node "B" and that the destination is node "A". The TCP field indicates that the source port on node "B" is port "1057", and that the destination port on node "A" is port "23". At the VPG layer, node "B" looks up node "A" in VPG Table 504 to determine that node "A" is a member of "VPG2" but not behind a NAT device. The VPG layer then builds the ESP encapsulation of the data using the security association information for "VPG2". Packet 520 includes the encrypted data. Packet 520 also includes a TCP field, an ESP field, and an IP field. The TCP field is copied from packet 518. Packet 520 is then transmitted to node "N".

Node "N" inspects packet 520, makes an entry in NAT Table 508, and then modifies the packet to appear to have come from node "N". Node "N" builds packet 522 and transmits across Internet network 510 to node "A". The modified IP field of packet 522 indicates that node "N" is the source of transmitted data. This effectively hides the true source IP address of node "B".

Node "A" receives packet 522. The VPG layer on node "A" looks up node "N" in VPG Table 516 to verify that node "N" is a member of "VPG2". Node "A" verifies that the packet was properly encapsulated, and then decrypts the data into packet 524. Packet 524 includes a decrypted data field, a TCP field, and an IP field. The next protocol field in the IP field is set to match the actual transport layer protocol. Resulting packet 524 can be sent to an IP layer in node "A".

Figure 5C:
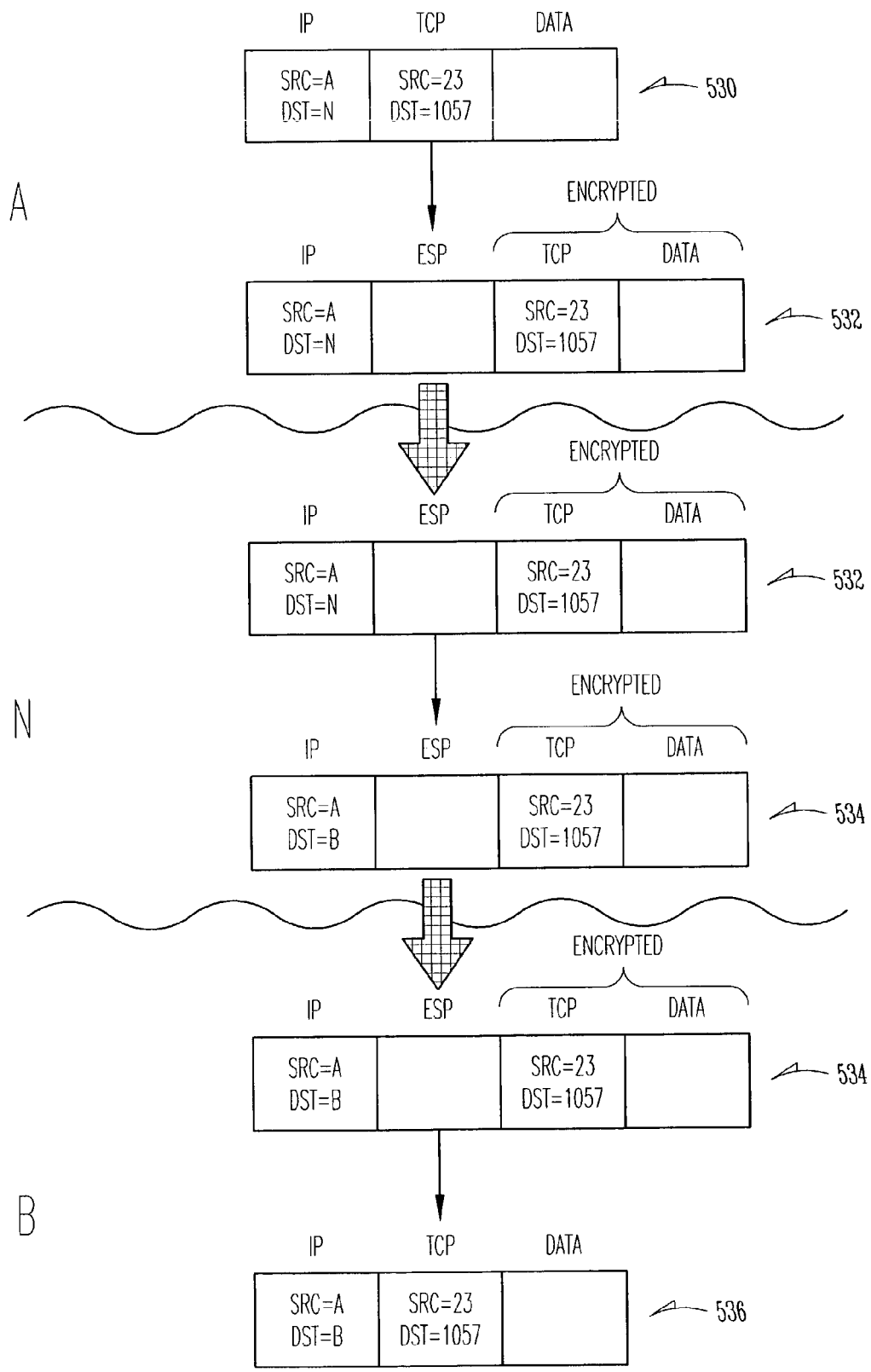
FIG. 5C is a packet diagram illustrating a second packet-level flow of data in the VPG system shown in FIG. 5A.

FIG. 5C is a packet diagram illustrating a second packet-level flow of data in the VPG system shown in FIG. 5A. In the example shown in FIG. 5C, node "A" is transmitting data back to node "B". Node "A" begins by building packet 530, which includes a data field, a TCP field, and an IP field. The IP field indicates that the source is node "A" and that the destination is node "N". This is due to the fact that node "B" is behind node "N" (a NAT device), and only has visibility to node "N". The TCP field, however, includes a destination port of "1057" on node "N", which node "A" includes on the assumption that it will be properly routed to node "B" by the NAT device. At the VPG layer, node "A" looks up node "N" in VPG Table 516 to determine that node "N" is a member of "VPG2." The VPG layer then builds the ESP encapsulation of the data using the security association information for "VPG2". Packet 532 includes the encrypted data. Packet 532 also includes a TCP field, an ESP field, and an IP field. The TCP field is copied from packet 530. Packet 532 is then transmitted to node "N" across Internet network 510.

Node "N" inspects packet 532. Node "N" references NAT Table 508 to identify the internal IP address for node "B." Node "N" then builds packet 534 and transmits it to node "B". Packet 534 includes a modified IP field. The modified IP field of packet 534 indicates that node "B" is the true intended destination for the data.

Node "B" receives packet 534. The VPG layer on node "B" looks up node "A" in VPG Table 504 to verify that node "A" is a member of "VPG2". Node "B" verifies that the packet was properly encapsulated, and then decrypts the data into packet 536. Packet 536 includes a decrypted data field, a TCP field, and an IP field. Resulting packet 536 can be sent to an IP layer in node "B".

Figure 6:
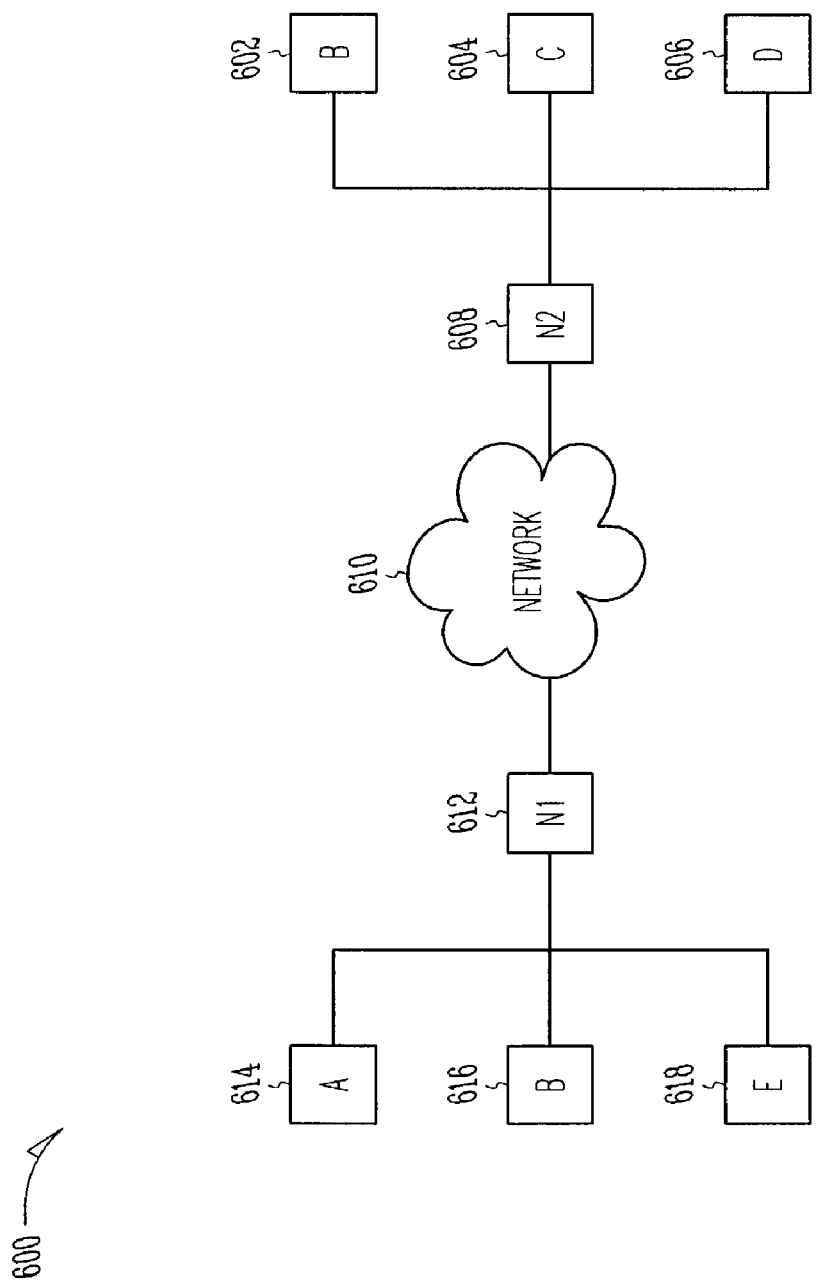
FIG. 6 is a network diagram illustrating a VPG system having multiple nodes and multiple NAT devices according to an embodiment of the invention.

FIG. 6 is a network diagram illustrating a VPG system having multiple nodes and multiple NAT devices according to an embodiment of the invention. This embodiment exemplifies the use of a VPG's for communications between remote offices. Network 600 includes node 614, node 616, node 618, node 612, network 610, node 608, node 602, node 604, and node 606. Nodes 612 and 608 are NAT devices. Nodes 614, 616, and 618 are each coupled to NAT device 612, and operatively coupled to the Internet network. Nodes 602, 604, and 606 are each coupled to NAT device 608, and operatively coupled to the Internet network. In this embodiment, the non-NAT nodes represent remote offices in an organization. In one embodiment, nodes 614, 616, and 618 are members of a first VPG, and nodes 602, 604, and 606 are members of a second VPG. The nodes communicate securely with other members of the group. In another embodiment, nodes 614 and 602 are members of a VPG. Even though node 614 is insulated behind NAT device 612, and node 602 insulated behind NAT device 608, nodes 614 and 602 can still be members of a VPG, and can share secure communications over network 610. In another example embodiment, node 616 and node 606 are members of a VPG. FIG. 6 is intended to show the flexibility of certain embodiments of VPG's, and to demonstrate how nodes behind NAT devices may still be members of VPG's.

Figure 7:
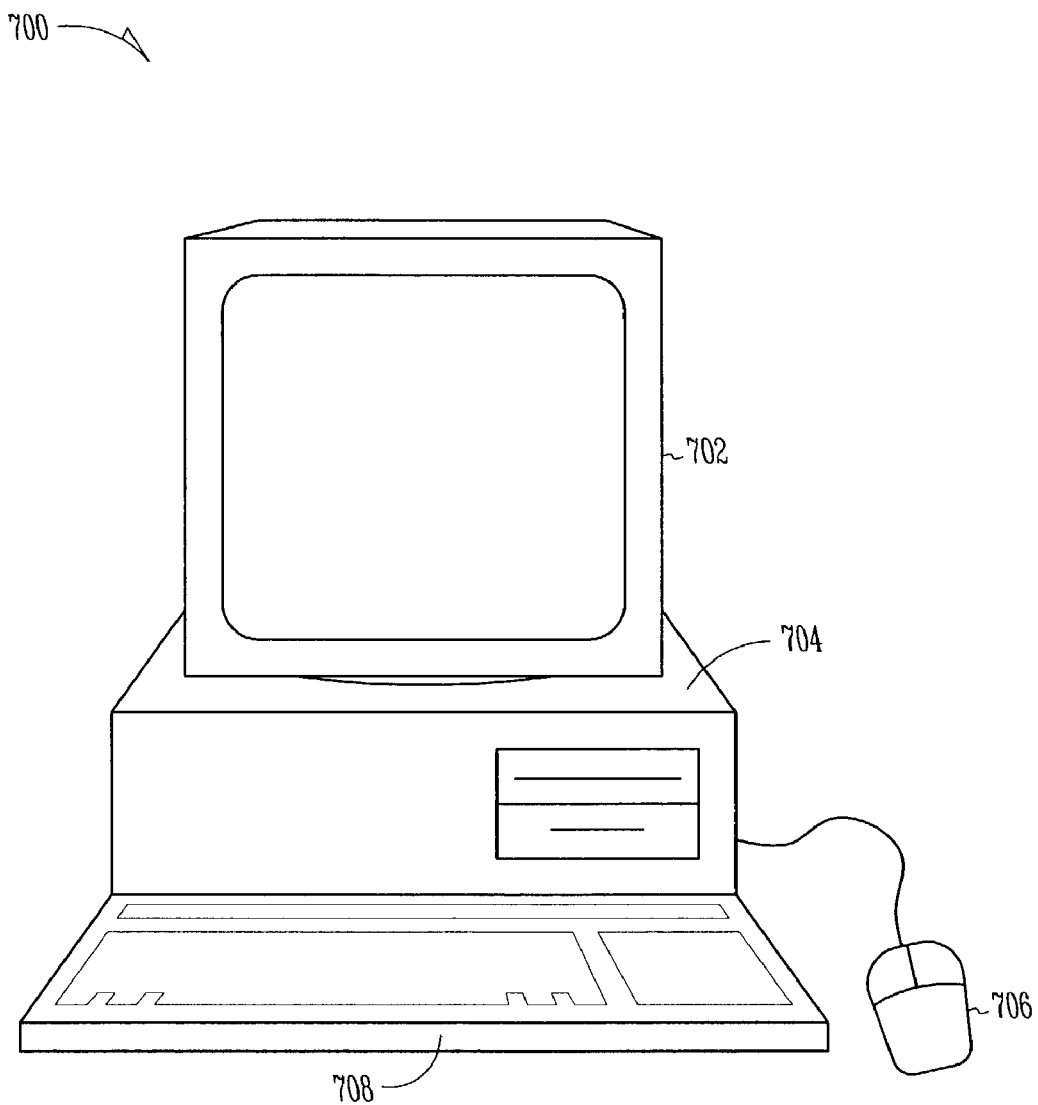
FIG. 7 is a system diagram illustrating a VPG node according to an embodiment of the invention.

FIG. 7 is a system diagram illustrating a VPG node according to an embodiment of the invention. FIG. 7 shows just one example of a VPG node. Node 700 includes display 702, processing unit 704, pointing device 706, and keyboard 708. Processing unit 704 is operatively coupled to display 702, pointing device 706, and keyboard 708. Processing unit 704 includes a processor, a memory, and one or more storage devices. The memory, in certain embodiments, includes both random-access memory (RAM) and read-only memory (ROM). The one or more storage devices, in certain embodiments, include a hard disk drive, a floppy disk drive, an optical disk drive, and/or a tape cartridge drive. Therefore, processing unit 704 includes one or more computer-readable media having computer-executable instructions stored thereon, the computer-executable instructions to be executed by the processor from the memory to perform methods of operation of various embodiments of the present invention.

In one embodiment, node 700 also includes a network interface device coupled to processing unit 704, the network interface device having a processor, a memory, and a computer-readable medium containing computer-executable instructions stored thereon, the computer-executable instructions to be executed by the processor of the network interface device from the memory of the network interface device to perform methods of operation of various embodiments of the present invention.

In other embodiments, VPG nodes operate in a wireless network. In these embodiments, the VPG nodes may comprise cellular phones, PDA's, and the like.

Methods of Use

There are a number of implementations, or methods of use, of embodiments of a VPG system and protocol. The methods of use described below are a non-exclusive set of examples that illustrate the power and flexibility of these embodiments of a VPG.

In one embodiment, a VPG system is used to protect a single organization or office. This is a common implementation for a VPG. In this embodiment, all hosts within an organization at a particular location would be placed in a single VPG. All traffic among these hosts would be encrypted, and no foreign host could plug into the network and be able to snoop data or transmit data on the organization's network. Further, by making the internal network side of the organization's perimeter firewall a member of the VPG, no host could get to an external network without going through the firewall. For example, to get to the Internet, a host on the internal network must route its packets through the firewall that would decrypt them, apply filtering, and then send plaintext packets to the external network. Since there is no restriction on the number of VPG's that a host can be a member of, it is possible to subdivide the organization into separate VPG's. Hosts in an accounting department could be cryptographically separated from the engineering department by placing them in separate VPG's. Hosts that require access to both networks could be placed in both VPG's. All of this would be transparent to the users and would be centrally managed by a policy server. In one embodiment, a VPG system can also be used for remote offices in an organizational infrastructure.

In another embodiment, a VPG system is used to allow a home user to telecommute. In this embodiment, a telecommuter may have a Digital Subscriber Line (DSL) connection or cable modem with a NAT device sitting between the home computer and the Internet service provider. A policy server must be visible to the home computer, so that when it boots, it can obtain a VPG policy. When the policy server receives the home computer's request for a VPG table, it also records the external IP address on the NAT device being used for the traffic. Thus, in addition to sending a VPG table to the home computer, the policy server also updates the VPG tables on the other members of the VPG with the IP address to use in packets destined for the home computer through the NAT.

In another embodiment, a VPG system can be used for roaming users. Most organizations have users with laptops that wish to use the organization's computer resources from various remote sites. These machines can pop up anywhere and will have unpredictable IP addresses, and will frequently be behind NAT devices whose external IP addresses are not known in advance. In one implementation, the NAT device is not initially part of the VPG. When the roaming user boots his or her node behind the NAT device and contacts its policy server to obtain a VPG table, the policy server must authenticate the node, and take note of the IP addresses being used for NAT. Once the node's identity is established, the policy server updates the VPG tables of the other members of the VPG to include an entry for the NAT device.

In another embodiment, a VPG system is used in wireless Local Area Network (LAN) systems. Multiple group members can communicate securely over the wireless LAN.

In another embodiment, a VPG system is used for managing a secure videoconferencing environment on the Internet or other network. Groups can be dynamically formed for collaboration. Group members can be dynamically added and removed, and all traffic is encrypted between specified IP addresses in the group.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the described embodiments of the present invention.

What is claimed is:

1. A method for transmitting secure data from a first node to a second node, the method comprising:
    modifying the network stack below the application layer to include virtual private group functionality;
    accessing a group membership table with a process functioning below the application layer in the network stack on the first node, the group membership table having group membership information for each group, including a first group, to which the first node belongs and group security information associated with each group, wherein the first group has two or more members;
    checking the group membership table with a process functioning below the application layer in the network stack to determine if the second node is a member of the first group; and
    if the second node is a member of the first group, encrypting a data packet using the group security information associated with the first group, processing the encrypted data packet, and transmitting the encrypted data packet from the first node to the second node.

2. The method of claim 1, wherein the accessing of the group membership table includes adding a group member to one of the groups.

3. The method of claim 1, wherein the accessing of the group membership table includes removing a group member from one of the groups.

4. The method of claim 1, wherein the accessing of the group membership table includes managing a plurality of group member entries for each group in the group membership table, each group member entry having a node address and group security association information.

5. The method of claim 1, wherein the accessing of the group membership table includes managing a plurality of group member entries for each group in the group membership table, each group member entry having an Internet Protocol address and group security association information.

6. The method of claim 5, wherein the checking of the group membership table includes checking the group membership table to determine if one of the group member entries for the first group includes the Internet Protocol address of the second node.

7. The method of claim 1, wherein the encrypting of the data packet includes encrypting the data packet using a symmetric encryption algorithm.

8. The method of claim 1, wherein the encrypting of the data packet includes encapsulating the data packet using an Encapsulating Security Payload header.

9. The method of claim 1, wherein the processing of the encrypted data packet includes adding an Internet Protocol header to the encrypted data packet.

10. A method for transmitting secure data from a first node in a virtual private group to other nodes in the virtual private group, the method comprising:
    modifying the network stack below the application layer to include virtual private group functionality;
    accessing a group membership table with a process functioning below the application layer in the network stack on the first node, the group membership table having group security information associated with the virtual private group;
    checking the group membership table with a process functioning below the application layer in the network stack to verify that the other nodes are members of the virtual private group; and
    upon such verification, encrypting data using the group security information associated with the virtual private group, processing the encrypted data packet, and transmitting the encrypted data packet from the first node to each of the other nodes in the virtual private group.

11. A method for receiving secure data on a first node that is sent from a second node, the method comprising:
    modifying the network stack below the application layer to include virtual private group functionality;

accessing a group membership table with a process functioning below the application layer in the network stack on the first node, the group membership table having group membership information for each group, including a first group, to which the first node belongs and group security information associated with each group, wherein the first group has two or more members;

checking the group membership table with a process functioning below the application layer in the network stack to determine if the second node is a member of the first group; and if the second node is a member of the first group, validating an encrypted data packet that has been sent from the second node, decrypting the encrypted data packet using the group security information associated with the first group, and processing the decrypted data packet.

12. The method of claim 11, wherein the accessing of the group membership table includes adding a group member to one of the groups.

13. The method of claim 11, wherein the accessing of the group membership table includes removing a group member from one of the groups.

14. The method of claim 11, wherein the accessing of the group membership table includes managing a plurality of group member entries for each group in the group membership table, each group member entry having a node address and group security association information.

15. The method of claim 11, wherein the accessing of the group membership table includes managing a plurality of group member entries for each group in the group membership table, each group member entry having an Internet Protocol address and group security association information.

16. The method of claim 15, wherein the checking of the group membership table includes checking the group membership table to determine if one of the group member entries for the first group includes the Internet Protocol address of the second node.

17. The method of claim 11, wherein the validating of the encrypted data packet includes authenticating the encrypted data packet using the group security information associated with the first group.

18. The method of claim 11, wherein the decrypting of the encrypted data packet includes decrypting the encrypted data packet using a symmetric encryption algorithm.

19. The method of claim 11, wherein the decrypting of the encrypted data packet includes decrypting the encrypted data packet using an Encapsulating Security Payload header.

20. The method of claim 11, wherein the processing of the decrypted data packet includes filtering the decrypted data packet to detect unauthorized packets.

21. A node for transmitting secure data to a device, the node comprising:

a processor;

a memory; and a computer-readable medium having computer-executable instructions stored thereon, the computer-executable instructions to be executed by the processor from the memory to:

modify the network stack below the application layer to include virtual private group functionality;

access a group membership table with a process functioning below the application layer in the network stack on the node, the group membership table having group membership information for each group, including a first group, to which the node belongs and group security information associated with each group, wherein the first group has two or more members;

verify from the group membership table with a process functioning below the application layer in the network stack that the device is also a member of the first group;

encrypt a data packet using the group security information associated with the first group;

process the encrypted data packet; and transmit the encrypted data packet to the device.

22. The node of claim 21, wherein the group membership table includes a plurality of group member entries for each group, and wherein each group member entry includes a node address and group security association information.

23. The node of claim 21, wherein the group membership table includes a plurality of group member entries for each group, and wherein each group member entry includes an Internet Protocol address and group security association information.

24. A node for transmitting secure data to a device, the node comprising:

a processing unit; and a network interface device coupled to the processing unit, the network interface device having a processor, a memory, and a computer-readable medium containing computer-executable instructions stored thereon, the computer-executable instructions to be executed by the processor from the memory to:

modify the network stack below the application layer to include virtual private group functionality;

access a group membership table with a process functioning below the application layer in the network stack on the node, the group membership table having group membership information for each group, including a first group, to which the node belongs and group security information associated with each group, wherein the first group has two or more members;

verify from the group membership table with a process functioning below the application layer in the network stack that the device is also a member of the first group;

encrypt a data packet using the group security information associated with the first group;

process the encrypted data packet; and transmit the encrypted data packet to the device.

25. The node of claim 24, wherein the group membership table includes a plurality of group member entries for each group, and wherein each group member entry includes a node address and group security association information.

26. The node of claim 24, wherein the group membership table includes a plurality of group member entries for each group, and wherein each group member entry includes an Internet Protocol address and group security association information.

27. A node for receiving secure data from a device, the node comprising:

a processor;

a memory; and a computer-readable medium having computer-executable instructions stored thereon, the computer-executable instructions to be executed by the processor from the memory to:

modify the network stack below the application layer to include virtual private group functionality;

access a group membership table with a process functioning below the application layer in the network stack on the node, the group membership table having group membership information for each group, including a first group, to which the node belongs and group security information associated with each group, wherein the first group has two or more members;

verify from the group membership table with a process functioning below the application layer in the network stack that the device is also a member of the first group;

validate an encrypted data packet that has been sent from the device;

decrypt the encrypted data packet using the group security information associated with the first group; and process the decrypted data packet.

28. The node of claim 27, wherein the group membership table includes a plurality of group member entries for each group, and wherein each group member entry includes a node address and group security association information.

29. The node of claim 27, wherein the group membership table includes a plurality of group member entries for each group, and wherein each group member entry includes an Internet Protocol address and group security association information.

30. A node for receiving secure data from a device, the node comprising:

a processing unit; and a network interface device coupled to the processing unit, the network interface device having a processor, a memory, and a computer-readable medium containing computer-executable instructions stored thereon, the computer-executable instructions to be executed by the processor from the memory to:

modify the network stack below the application layer to include virtual private group functionality;

access a group membership table with a process functioning below the application layer in the network stack on the node, the group membership table having group membership information for each group, including a first group, to which the node belongs and group security information associated with each group, wherein the first group has two or more members;

verify from the group membership table with a process functioning below the application layer in the network stack that the device is also a member of the first group;

validate an encrypted data packet that has been sent from the device;

decrypt the encrypted data packet using the group security information associated with the first group; and process the decrypted data packet.

31. The node of claim 30, wherein the group membership table includes a plurality of group member entries for each group, and wherein each group member entry includes a node address and group security association information.

32. The node of claim 30, wherein the group membership table includes a plurality of group member entries for each group, and wherein each group member entry includes an Internet Protocol address and group security association information.

33. A system for secure group communications, ;the system comprising:

a policy server;

a first communication network connected to a public communications network by a first firewall;

a second communication network connected to the public communications network by a second firewall;

a first virtual private group member node including a network interface device connected to the first communication network;

a second virtual private group member node including a network interface device connected to the second communication network;

wherein the first and second virtual private group member node's network interface device includes a processor, a memory, a network stack modified below the application layer to include virtual private group functionality, and a computer-readable medium having computer-executable instructions stored thereon, the computer-executable instructions to be executed by the processor form the memory on the first virtual private group member node to:

receive from the policy server a group membership table, the group membership table having group membership information for each group, including a first group, to which the first virtual private group member node belongs and group security information associated with each group, wherein the first group has two or more members;

access the group membership table with a process functioning below the application layer in the network stack on the first virtual private group member node;

verify from the group membership table with a process functioning below the application layer in the network stack that the second virtual private group member node is also a member of the first group;

encrypt a data packet using the group security information associated with the first group;

process the encrypted data packet; and transmit the encrypted data packet to the second virtual private group member node.

34. The system of claim 33 wherein the computer-executable instructions to be executed by the processor form the memory on the second virtual private group member node to:

receive from the policy server a group membership table, the group membership table having group membership information for each group, including a first group, to which the second virtual private group member node belongs and group security information associated with each group, wherein the first group has two or more members;

access the group membership table with a process functioning below the application layer in the network stack on the second virtual private group member node;

verify from the group membership table with a process functioning below the application layer in the network stack that the first virtual private group member node is also a member of the first group;

receive the encrypted data packet sent from the first virtual private group member;

decrypt the encrypted data packet using the group security information associated with the first group; and process the decrypted data packet.

35. The system of claim 33 further comprising:

a third virtual private group member node including a network interface device connected to the first communication network;

wherein the third virtual private group member node's network interface device includes a processor, a memory, a network stack modified below the application layer to include virtual private group functionality, and a computer-readable medium having computer-executable instructions stored thereon, the computer-executable instructions to be executed by the processor form the memory to:

receive from the policy server a group membership table, the group membership table having group membership information for each group, including a second group, to which the third virtual private group member node belongs and group security information associated with each group, wherein the second group has two or more members;

access the group membership table with a process functioning below the application layer in the network stack on the third virtual private group member node;

verify from the group membership table with a process functioning below the application layer in the network stack that the first virtual private group member node is also a member of the second group;

encrypt a data packet using the group security information associated with the second group;

process the encrypted data packet; and transmit the encrypted data packet to the first virtual private group member node.

\* \* \* \* \*

UNITED STATES PATENT AND TRADEMARK OFFICE
CERTIFICATE OF CORRECTION

| | | |
|---|---|---|
| PATENT NO. | : 7,231,664 B2 | Page 1 of 1 |
| APPLICATION NO. | : 10/234224 | |
| DATED | : June 12, 2007 | |
| INVENTOR(S) | : Markham et al. | |

It is certified that error appears in the above-identified patent and that said Letters Patent is hereby corrected as shown below:

On the Title Page Item 56, under "Other Publications", line 1, delete "Priviate" and insert -- Private --, therefor.

On the Title Page Item 56, under "Other Publications", line 2, delete "Communications ," and insert -- Communications, --, therefor.

On the Title Page Item 56, under "Other Publications", line 2, delete "Management ," and inset -- Management, --, therefor.

In column 1, line 57, delete "Ipsec" and insert -- IPsec --, therefor.

In column 6, line 14, before "using" delete "datapacket" and insert -- data packet --, therefor.

In column 16, line 1, in Claim 33, delete ";the" and insert -- the --, therefor.

Signed and Sealed this

Twenty-first Day of August, 2007

JON W. DUDAS
*Director of the United States Patent and Trademark Office*